Oct. 30, 1951 H. HANSEN 2,573,101
LATHE
Filed Oct. 18, 1946 5 Sheets-Sheet 5
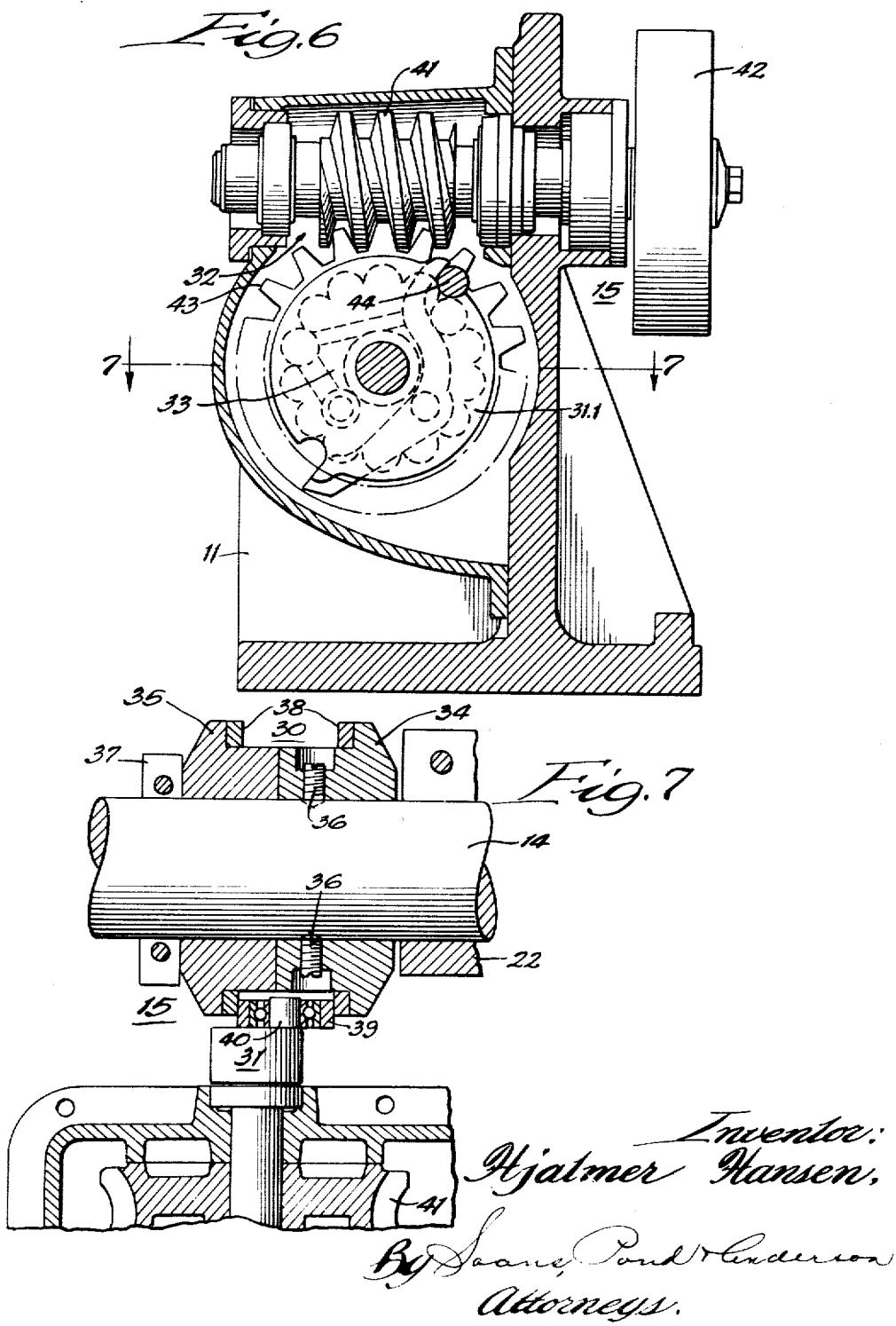
Inventor:
Hjalmer Hansen,
By Soans, Pond & Anderson
Attorneys.

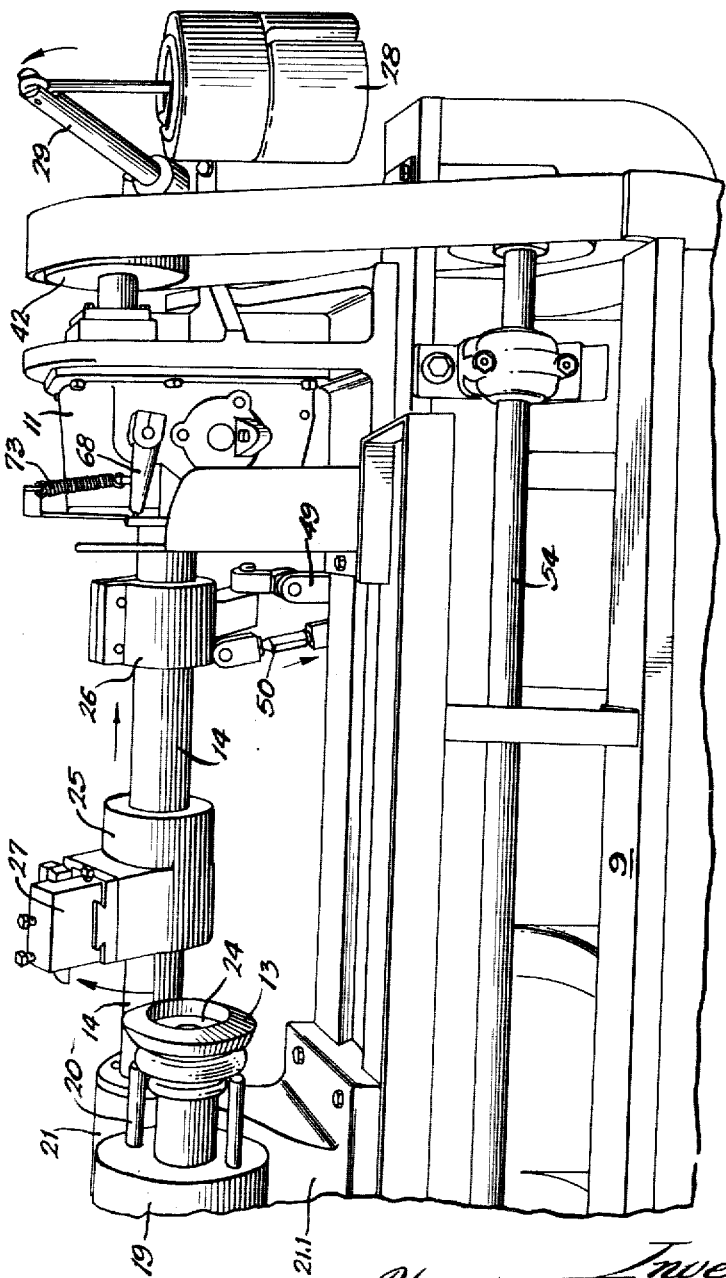

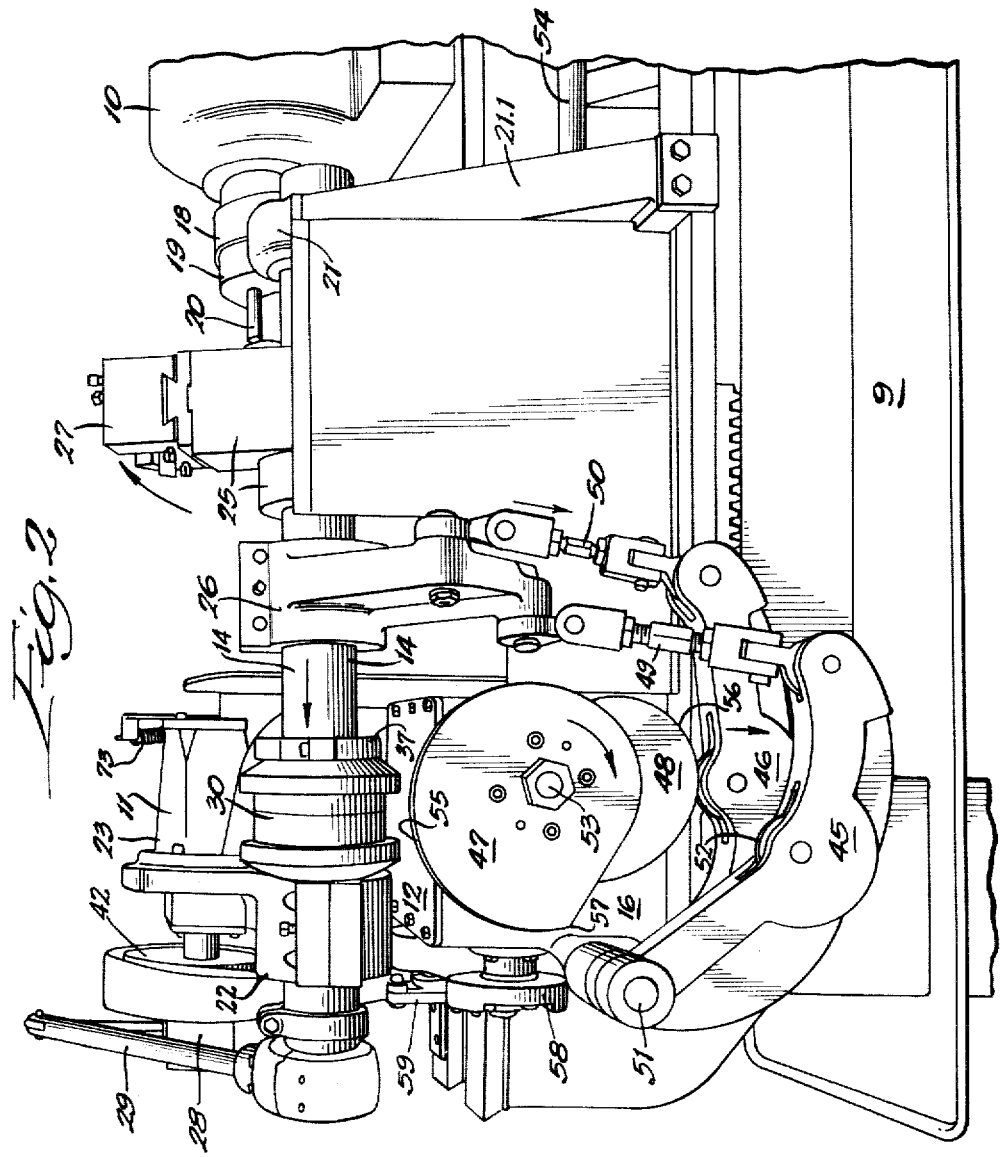

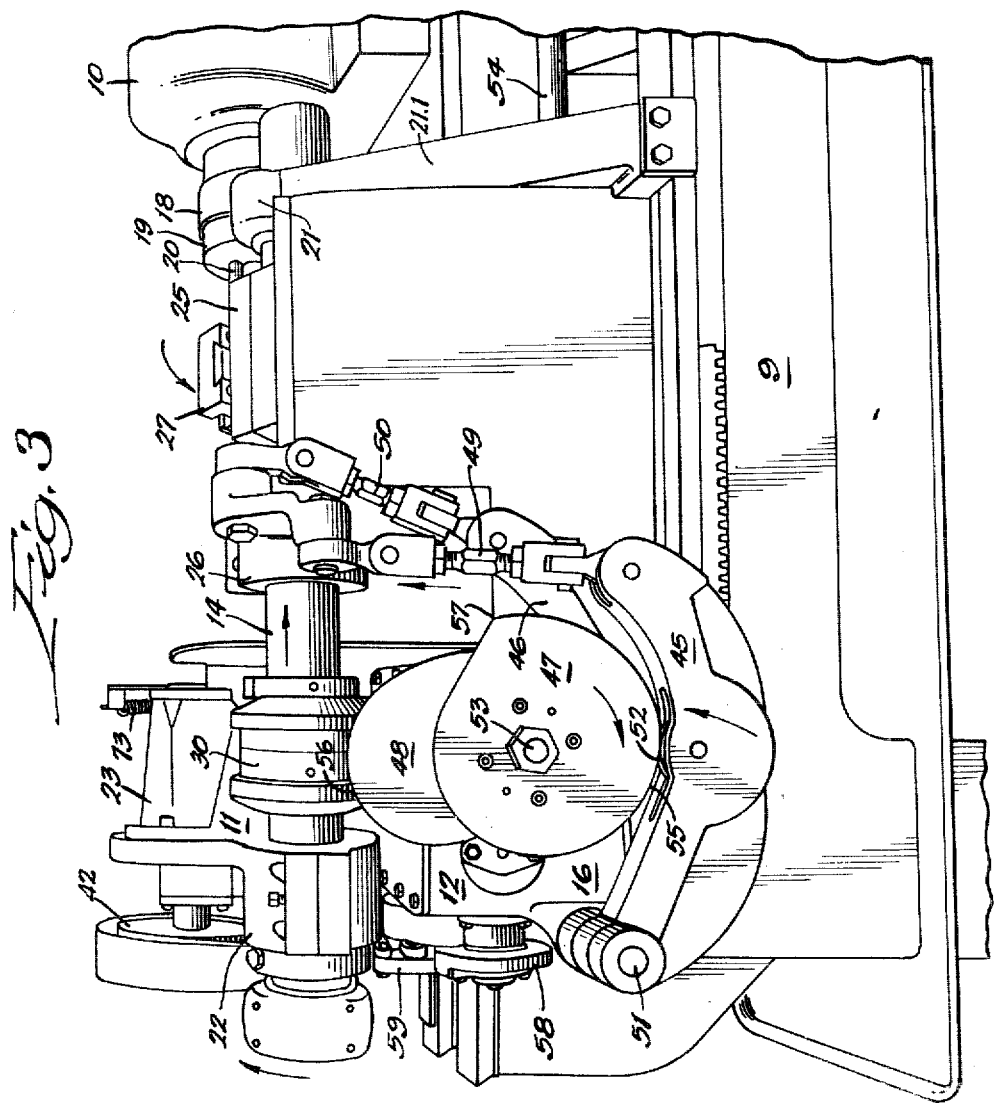

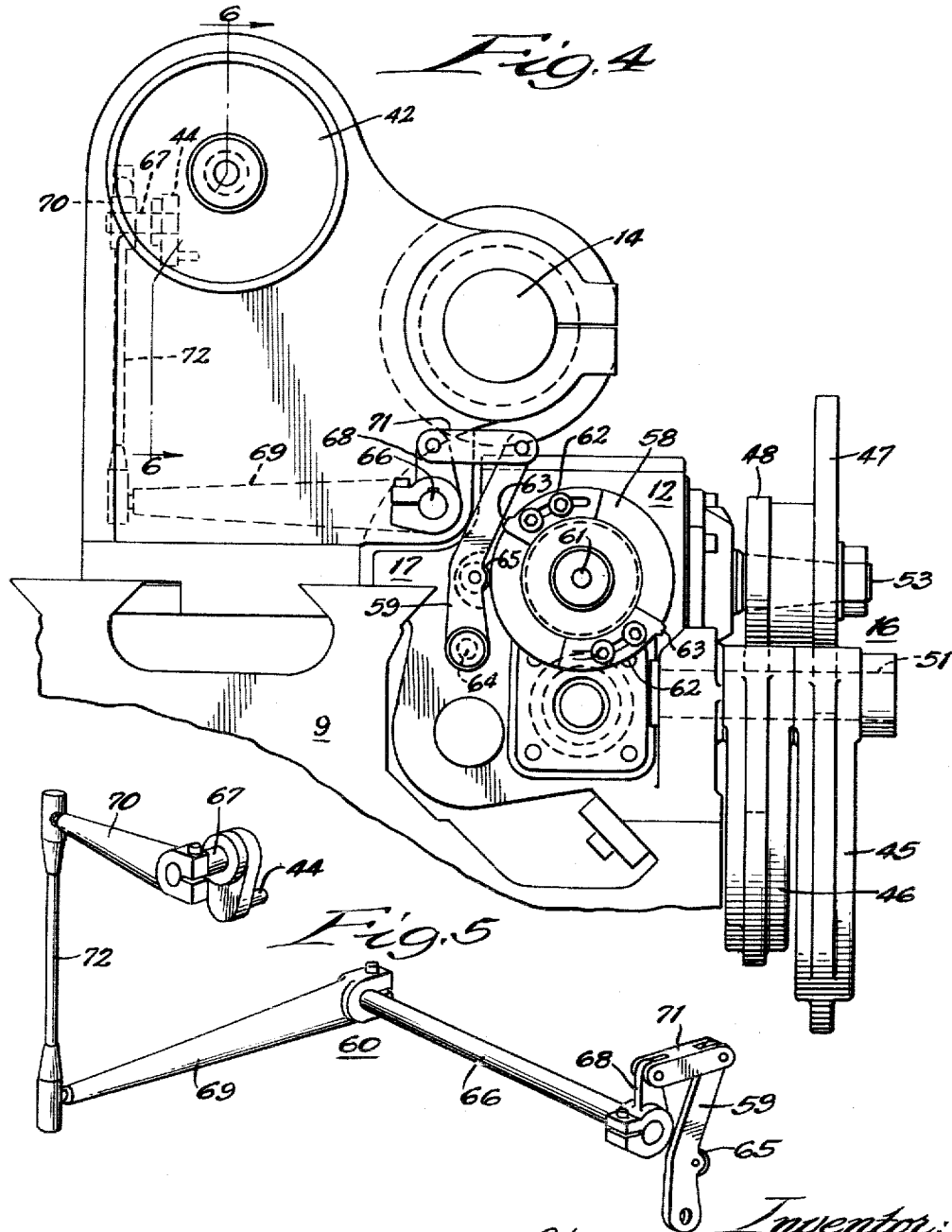

Patented Oct. 30, 1951

2,573,101

UNITED STATES PATENT OFFICE 2,573,101

LATHE

Hjalmer Hansen, Racine, Wis., assignor to J. I. Case Company, Racine, Wis., a corporation of Wisconsin Application October 18, 1946, Serial No. 704,032

9 Claims. (Cl. 82—2)

1

The present invention relates to lathe attachments and has particular relation to a lathe attachment which is automatically operable to perform a facing operation. A facing operation, as the term will be used herein, is a machining operation wherein a cut is taken along a surface which is disposed normal to the axis of rotation of a work piece. Such operation is effected by causing a metal cutting tool to engage the face of the work piece, usually at the center of rotation of that piece, following which the cutting tool is moved outward in a generally radial direction a predetermined distance. The cutting tool is held during the cutting operation so that it does not move longitudinally relative to the axis of rotation of the work piece.

A facing operation is adapted to remove a layer of metal from a relatively flat surface of a work piece such as a gear blank. It may also be employed repetitively to provide a recess in the surface of a work piece and when a recess is cut by this operation, the circumferential surface of the recess will also be machined due to the repeated cyclic movement of the cutting tool which ends at the same radial distance from the center of rotation of the work piece.

The main object of this invention are, to provide a work-facing attachment for lathes; to provide improved operating mechanism for an attachment of this kind whereby the facing tool is automatically moved through a recurring cycle from a neutral or retracted position into a work-facing position, through the facing operation, and back from the work-facing operation to the neutral position; to provide improved indexing means for properly effecting the sequence of these movements of the tool; to provide an improved attachment of this kind particularly adapted for use in machining a surface normal to the axis of the blank where the tool moves from the axis of the blank outwardly toward the periphery of the work, particularly as required for gear blanks; and to provide an improved work-facing tool and operating mechanism of this kind which is capable of attachment to the standard lathe.

A preferred form of lathe-facing attachment embodying this invention is shown in the accompanying drawings, in which:

Fig. 1 is a front perspective of a conventional type lathe to which this improved attachment has been applied, the arrows indicating the extreme positions of the movable parts;

Fig. 2 is a rear perspective of the same showing the cam mechanism in one of its extreme

2 positions, the arrows indicating the extreme positions of the movable parts;

Fig. 3 is a view similar to Fig. 2 showing the cam mechanism in the other of its extreme positions, the arrows indicating the extreme positions of the movable parts;

Fig. 4 is a view from the left end of Fig. 1, some of the parts at the extreme end being omitted for the sake of clarifying the arrangement of other parts;

Fig. 5 is a diagrammatic perspective of the rocker-arm and link connection which forms a part of the indexing means;

Fig. 6 is an enlarged cross-sectional detail taken on the line 6—6 of Fig. 4 illustrating the arrangement of the cyclic clutch which controls the action of the traverse mechanism for the tool-holding ram; and Fig. 7 is an enlarged fragmentary detail taken on the line 7—7 of Fig. 6.

The preferred form of lathe-facing attachment constructed in accordance with this invention comprises, a base or bed 9 which provides support for a head stock 10, a tail stock 11, and an auxiliary stock 12, all supported on the base in the usual manner. The head stock 10 supports the work 13. The tail stock 11, in addition to co-acting with the head stock 10 to support the tool-holding ram 14, provides support for the ram-traversing mechanism 15. The auxiliary stock supports the ram-rotating mechanism 16, and in addition co-acts with the tail stock 11 to support the indexing mechanism 17.

The head stock 10 is of a more or less conventional nature. It journals a spindle 18 on which is mounted a chuck or work-holding member 19. The chuck 19 is provided with gage pins 20 which properly locate the work 13 on the chuck 19. A bearing 21 mounted on a base 21.1 co-acts with a bearing 22 on the tail stock 11 for supporting the ram 14.

The tail stock 11 is likewise of a more or less conventional nature. It is shiftably mounted on the usual ways on the base and provided with appropriate clamping means for locking it in position on the bed 9. The tail stock mounts a housing 23 which provides an enclosed support for the traverse means 15 and for parts of the indexing mechanism 17.

The auxiliary stock 12 is of a rather special construction. It, too, is mounted on suitable ways on the bed and adapted to be clamped in position. This auxiliary stock 12 provides a support for the ram-rotating mechanism 16 and the indexing mechanism 17, and provides a housing for the gearing for operating these mechanisms.

The work 13, as herein shown, is a cast blank for a gear. Before the teeth can be cut therein it is necessary that the face of the recessed part 24 in the blank shall be machined to provide a flat surface which is disposed normal to the axis of the work 13. This must be accomplished through a movement of a tool radially outward from the work axis.

The tool-holding ram 14 is in the form of a shaft mounted in the bearings 21 and 22, on the head stock 10 and tail stock 11, respectively, so as to be axially slidable and radially rotatable. The ram 14 mounts the oppositely-disposed arms 25 and 26. The former provides a support for the tool holder 27 and the latter provides for attachment to the ram-rotating mechanism 16, as will appear more fully hereinafter. A weight 28 connected at the outer end of the ram 14, by means of an arm 29, normally urges the ram 14 in a counter-clockwise direction as viewed from the right hand end of Fig. 1.

The ram-traversing mechanism 15 comprises a collar 30 fixed on the ram 14 and with which co-acts a crank pin 31, actuated by a worm and gear 32 under the control of a cyclic clutch 33 (see Fig. 6), for reciprocating the ram axially.

The collar 30 is preferably formed of two parts, 34 and 35 (see Fig. 7). The former is secured to the ram by means of set screws 36 whereas the latter is free on the shaft but held in contact with the one part by means of a collar 37. The inner faces of each of these parts 34 and 35 have bearing rings 38 fixed thereon for engagement with the roller bearing 39 journaled on the stud shaft 40 of the crank pin 31.

The worm and gear 32 and associated cyclic clutch 33 are of a well-known construction. The worm 41 is constantly driven by a pulley 42 and rotates a gear 43. Each time that a crank pin 44 (see Figs. 5 and 6) is retracted a disc 31.1 integral with the crank pin 31, and forming a part of the cyclic clutch 33, is released for a half revolution.

The ram-rotating mechanism 16 comprises a pair of rocker arms 45 and 46 adapted to be actuated by cams 47 and 48 whereby, through the connection of said cam rocker arms 45 and 46 to the ram rocker arm 26 by means of the links 49 and 50, the ram 14 is adapted to be rotatively or radially reciprocated.

The cam rocker arms 45 and 46 are co-axially mounted on a shaft 51, journaled on the auxiliary stock 12, and are provided with anti-friction rollers 52 against which the cams 47 and 48 engage.

The cams 47 and 48 are co-axially mounted on a shaft 53 also journaled on the auxiliary stock 12 and connected by suitable gearing, within said auxiliary stock, to a drive shaft 54 (see Fig. 3).

As will be clearly observed from Figs. 2 and 3, the cams 47 and 48 each have an eccentric peripheral section, 55 and 56 respectively. The cams are mounted on the shaft 53 so that these eccentric peripheral sections 55 and 56 are diametrically opposed. Obviously, these sections 55 and 56 actuate the respective cam rocker arms 45 and 46 to effect the opposite rotational movements of the ram 14. Since the cam 47 is the one that causes the rotational movement of the ram 14 during the facing operation on the work 13, the increase of the eccentricity of the portion 55 is gradual up to the point 57 (see Figs. 2 and 3) from which point the periphery of the cam is sharply cut away to the intermediate concentric peripheral portion thereof. When the tool is moving into and out of axial alinement with the work 13 the swinging thereof, through the rotation of the ram 14, may be very rapid. Accordingly, the peak of the eccentric portion 56 of the cam 48 is more extreme and the approaches more steep than is the case with the cam 47, as is most clearly apparent from Figs. 2 and 3.

The cam rocker arms 45 and 46 are held in contact with the respective cams 47 and 48 by the weight 28. Therefore, by reason of the diammetrically-opposed relationship of the eccentric portions of the cams 47 and 48, one or the other of them is causing the rotation of the ram 14 when the respective eccentric portion thereof is in contact with the anti-friction roller 52 on the corresponding rocker arm. Thus the cam 47 will effect the rotation of the ram 14 to move the tool in the tool holder 27 radially outward normal to the axis of the work 13. This being the cutting movement of the tool, the movement has a controlled speed throughout the length of the cutting movement. The cam 48, on the other hand, will cause the ram 14 to have a very rapid radial movement for swinging the tool either from its neutral or retracted position, as shown in Fig. 1, into axial alinement with the work, or from such axial work-alined position back to the neutral position.

The indexing means 17 comprises, a tripper cam 58, a tripper arm 59, and a rocker-arm and link connection 60 for translating the movement of the rocker arm 59 to effect the periodic release of the cyclic clutch 33.

The tripper cam 58 is in the form of a disc mounted on a shaft 61 journaled on the auxiliary stock 12. By means of suitable gearing the rotation of the cam 58 is synchronized with the cam-rotating mechanism 16 so that the cam 58 makes a single revolution for each complete revolution of the cams 47 and 48. A pair of blocks 62, each having a cam lobe 63 formed thereon, are adjustably mounted on the disc 58 so as to locate the lobes 63 at diametrically-opposite points. These blocks being circumferentially adjustable makes it possible to position the lobes 63 at the precise points required for causing the tripper arm 59 to effect the release of the cyclic clutch 33 in correct sequence with action of the ram-rotating mechanism 16 on the ram 14.

The rocker arm 59 is pivoted at 64 on the auxiliary stock 12 so as to locate an anti-friction roller 65, carried by said arm, against the periphery of the tripper cam 58.

The rocker-shaft and link connection 60 comprises a pair of shafts 66 and 67, arms 68, 69, and 70, the crank pin 44, and a pair of links 71 and 72. Both of the shafts 66 and 67 (see Fig. 5) are journaled on the tail stock 11 at right angles of each other. The former is located adjacent and axially parallel to the tripper cam 58, whereas the latter is located adjacent and axially parallel to the cyclic clutch 33. The shaft 66 is connected to the tripper arm 59 by means of the arm 68 and the link 71. The rocker shaft 67 mounts the crank pin 44, positioned to normally engage the cyclic clutch 33 and hold it inactive. The two shafts 66 and 67 are connected together through the medium of the arms 69 and 70 and the link 72. A spring 73 (see Fig. 1) normally urges the arm 70 to cause the conection 60 to hold the rocker arm 59 with the anti-friction roller 65 in contact with the periphery of the tripper cam 58.

The operation of the lathe-facing attachment herein shown is as follows: After the work 13 is fixed in place on the chuck 19 and the proper tool is clamped into position on the tool holder 27, the usual control mechanism for activating the power means is actuated. Thereupon the tool is first moved from its neutral or retracted position into axial alinement with the work 13, whereupon it is shifted axially of the work into cutting position with reference to the work, following which it is moved radially outward normal to the axis of the work. During this movement, the tool cuts a layer of metal or other material from the face of the work, at the termination of this cutting operation the tool is retracted axially from the work and finally shifted radially back to its neutral or retracted position.

During the machining operation, the tool holder 27 is limited in its rotative movement by the adjustable links 49 and 50, and these links provide a convenient means for determining the radial dimension of the face being machined. At the end of this rotative movement, a slight fillet is left where the tool terminates its cutting arc. In the described operation, the sides of the recess 24 are neither enlarged nor machined, although it will be understood that the lathe attachment can be operated to produce a recess having machined sides as well as a machined face.

The shifting of the tool from its neutral or retracted into axial alinement with the work 13 is effected by means of the cam 48. As the eccentric part 56 of the cam recedes from the rocker arm 46 it permits the weight 28 to rotate the ram 14 to move the ram arm 25 to bring the tool on the tool holder 27 into axial alinement with the work 13.

As soon as the trailing low point of the cam 48 reaches the roller 52 on the rocker arm 46 the roller 52 on the rocker arm 45 comes into contact with the cam 47 at an advancing low point. It will be noted that these two low points are contiguous. However, the periphery of the cam 47 for a short distance is concentric with the axis of the cam. Accordingly, the tool remains in axial alinement with the work 13. At practically the instant that this rotative movement of the ram, to position the tool in axial alinement with the work, is completed, one of the lobes 63 on the tripper cam 58 contacts the anti-friction roller 65 on the tripper arm 59 and pushes it outwardly on its axis 64. This motion is translated through the connection 60 to the crank pin 44 so as to release the cyclic clutch 33. This release of the cyclic clutch 33 causes a rotation of the disc 31.1 through 180°, at which point it is again checked by the crank pin 44. The 180° rotation of the disc 31.1 causes the crank pin 31, acting on the collar 34 on the ram 14, to shift the ram aixally, moving the tool into cutting position with regard to the work 13.

At practically the instant that the tool reaches its cutting position with respect to the work, the eccentric part 55 of the cam 47 begins to depress the rocker arm 45 which is continued until the high point 57 of the cam passes a plane connecting the axes of the shaft 53 and the anti-friction roller 52 on the rocker arm 45. During this depression of the rocker arm 45 the ram 14 is rotated so as to move the tool through its cutting action on the work 13. The cutting action of the tool is instantly arrested as the flat part of the cam 47 trailing the high point 57 is presented to the anti-friction roller 52 on the rocker arm 45 and the weight on the ram 14 permits the ram to swing back to retract the tool radially away from the annular face which it has just finished cutting on the work 13. At about that instant the other lobe 63 on the tripper cam 58 contacts the anti-friction roller 65 on tripper arm 59. The swinging of the arm 59, through the connection 60, again retracts the crank pin 44 and releases the cyclic clutch 33. Once more the disc 31.1 is rotated 180° by the worm 41. The consequent rotation of the crank pin 31, acting on the collar 30, shifts the ram 14 axially so as to move the tool axially away from the work 13. This reverse axial movement of the ram 14 is completed as the advancing high point of the eccentric portion 56 of the cam 48 comes into contact with the anti-friction roller 52 on the rocker arm 46. As the cam 48 continues its movement the eccentric part 56, depressing the rocker arm 46, causes a rapid rotation of the ram 14 to move the arm 25 and the tool holder 27, carried thereby, back into their normal retracted positions.

Upon the completion of this cycle of movements of the tool-holding ram 14, the power to the lathe would be automatically cut off in a well-known manner. The work would thereupon be removed from the chuck 19 and an unmachined piece of work placed in position and the operation repeated.

Variations and modifications in the details of structure and arrangement of the parts may be resorted to within the spirit and coverage of the appended claims.

I claim:

1. In a device of the class described, the combination of, a supporting base, a work holder rotatably mounted on said base, a tool-supporting ram mounted on said base for axial and rotative reciprocation, traverse mechanism for effecting the intermittent axial movement of said ram, a radially-disposed arm secured to said ram, a pair of cam rocker arms mounted on said base, links connecting each of said cam rocker arms to said radially-disposed arm, a cam mounted to effect the reciprocation of each of said cam rocker arms, said cams being co-axially mounted so that the eccentric part of one cam is diametrically opposed to the eccentric part of the other cam, and indexing means operatively synchronized with said cams and controlling the action of said traverse mechanism for alternating the rotative and axial movements of said ram.

2. In a device of the class described, the combination of, a supporting base, a work holder rotatably mounted on said base, a tool-supporting ram mounted on said base for axial and rotative reciprocation, traverse mechanism for effecting the intermittent axial movement of said ram, a radially-disposed arm secured to said ram, a pair of cam rocker arms mounted on said base, adjustable links connecting each of said cam rocker arms to said radially-disposed arm, a cam mounted to effect the reciprocation of each of said cam rocker arms, said cams being co-axially mounted so that the eccentric part of one cam is diametrically opposed to the eccentric part of the other cam, and indexing means operatively synchronized with said cams and controlling the action of said traverse mechanism for alternating the rotative and axial movements of said ram.

3. In a device of the class described, the combination of, a supporting base, a work holder rotatably mounted on said base, a tool-supporting ram mounted on said base for axial and rotative reciprocation, traverse mechanism for effecting the intermittent axial movement of said ram, a radially-disposed arm secured to said ram, a pair of cam rocker arms mounted on said base, adjustable links connecting each of said cam rocker arms to said radially-disposed arm, a cam mounted to effect the reciprocation of each of said cam rocker arms, the eccentric portion of one cam being formed to secure a controlled radial movement of said ram in one direction whereas the eccentric portion of the other of said cams is formed to effect a rapid radial movement of said ram in both directions, said cams being co-axially mounted so that the eccentric part of one cam is diametrically opposed to the eccentric part of the other cam, and indexing means operatively synchronized with said cams and controlling the action of said traverse mechanism for alternating the rotative and axial movements of said ram.

4. In a device of the class described, the combination of, a supporting base, a work holder rotatably mounted on said base, a tool-supporting ram mounted on said base for axial and rotative reciprocation, traverse mechanism for effecting the intermittent axial movement of said ram, a radially-disposed arm secured to said ram, a pair of cam rocker arms mounted on said base, adjustable links connecting each of said cam rocker arms to said radially-disposed arm, a cam mounted to effect the reciprocation of each of said cam rocker arms, the eccentric portion on one cam being formed to secure a controlled radial movement of said ram in one direction whereas the eccentric portion of the other of said cams is formed to effect a rapid radial movement of said ram in both directions, said cams being co-axially mounted so that the eccentric part of one cam is diametrically opposed to the eccentric part of the other cam, indexing means operatively synchronized with said cams and controlling the action of said traverse mechanism for alternating the rotative and axial movements of said ram, and means for holding said cam rocker arms in contact with the respective cam surfaces of said cams.

5. In a device of the class described, the combination of, a supporting base, a working holder rotatably mounted on said base, a tool-supporting ram mounted on said base for axial and rotative reciprocation, a cam-actuated mechanism for effecting the intermittent radial reciprocation of said ram, a grooved collar on said ram, a crank pin mounted on said base and operatively engaging said collar, a constantly rotating gear mounted on said base, a cyclic clutch mechanism associated with the gear, means for interconnecting said clutch mechanism and said crank pin and indexing means operatively synchronized with said cam-actuated mechanism for effecting the release of said cyclic clutch so as to alternate the axial and radial shifting of said ram.

6. In a device of the class described, the combination of, a supporting base, a head stock mounted on said base and having a work-supporting spindle journaled thereon, a tail stock mounted on said base, an auxiliary stock mounted on said base, a ram journaled on said head and tail stocks for axial and radial reciprocation, a first radially-disposed arm secured to said ram and adapted to mount a tool-holder thereon, means for effecting axial reciprocation of said ram including a grooved collar secured to said ram, a crank pin journaled on said tail stock and operatively engaging said collar, a constantly-rotating gear mounted on said tail stock, and a cyclic clutch interposed between said gear and said crank pin for effecting intermittent movement of said crank pin, a second radially-disposed arm mounted on said ram, cam rocker arms co-axially pivoted on said auxiliary stock, links connecting said cam rocker arms with said second radially-disposed arm, a main cam shaft journaled on said auxiliary stock, a pair of cams on said shaft, said cams being fixed to rotate in unison with the eccentric part of one cam diametrically opposed to the eccentric part of the other cam, means for normally holding said cam rocker arms in contact with the respective cams, and indexing means operatively synchronized with said cam shaft for effecting the release of said cyclic clutch in timed relation with the operation of said cams to alternate the radial and axial shifting of said ram.

7. In a device of the class described, the combination of, a supporting base, a head stock mounted on said base and having a work-supporting spindle journaled thereon, a tail stock mounted on said base, an auxiliary stock mounted on said base, a ram journaled on said head and tail stocks for axial and radial reciprocation, a radially-disposed arm secured to said ram and adapted to mount a tool-holder thereon, means for axially reciprocating said ram including a grooved collar secured to said ram, a crank pin journalled on said tail stock and operatively engaging said collar, a constantly-rotating gear mounted on said tail stock, and a cyclic clutch interposed between said gear and said crank pin which is operable to effect intermittent axial reciprocation of said ram, a second radially disposed arm mounted on said ram, cam rocker arms co-axially pivoted on said auxiliary stock, links connecting said cam rocker arms with said second radially-disposed arm, a main cam shaft journaled on said auxiliary stock, a pair of cams on said shaft, said cams being fixed to rotate in unison with the eccentric part of one cam diametrically opposed to the eccentric part of the other cam, means for normally holding said cam rocker arms in contact with the respective cams, an indexing cam mounted on said auxiliary stock and synchronized with said cam shaft, rocker arm mounted adjacent to said indexing cam, and link- and rocker-shaft means connecting said rocker arm with said cyclic clutch whereby the release of said cylic clutch is alternated with the radial reciprocation of said ram effected by said cam mechanism.

8. In a device of the class described for machining a work piece, the combination of a supporting base, a work holder rotatably mounted upon said base for supporting the work piece to be machined, a tool supporting ram mounted on said base for axial and rotative movement, a tool secured to said ram, a traverse mechanism for effecting the intermittent axial movement of said ram, a radially disposed arm secured to said ram, a pair of cams mounted on said base, links operatively connected between each of said cams and said radially disposed arm, said cams being operable to control rocking movement of said ram about its longitudinal axis, and indexing means operatively synchronized with said cams and controlling the action of said traverse mechanism for successively causing said ram and tool to move axially toward said work holder to engage said tool with the work piece to be machined and to rock said ram so that said tool faces the work piece.

9. In a device of the class described adapted to machine a work piece, the combination of a supporting base, a work holder rotatably mounted upon said base for supporting the work piece which is to be machined, a tool supporting ram mounted on said base for axial and rotative movement, a tool secured to said ram, a transverse mechanism for effecting the intermittent axial movement of said ram, a radially disposed arm secured to said ram, a pair of cam rocker arms mounted on said base, links connecting each of said cam rocker arms to said radially disposed arm, a cam rotatably journaled on said base for effecting movement of each of said cam rocker arms, said cams being disposed in opposed relation and being operable to control movement of said radially disposed arm in opposite directions, and indexing means operatively synchronized with said cams and controlling the action of said traverse mechanism for successively causing said tool to move axially toward said work holder into engagement with the work piece to be machined and to rock said ram so that said tool faces the work piece.

HJALMER HANSEN.

REFERENCES CITED

The following references are of record in the file of this patent:

UNITED STATES PATENTS

| Number | Name | Date |
|---|---|---|
| 1,794,390 | Trobeck | Mar. 31, 1931 |
| 1,865,528 | Lovely | July 5, 1932 |
| 2,019,072 | Clemens | Oct. 29, 1935 |
| 2,317,522 | Curtis | Apr. 27, 1943 |
| 2,348,881 | Blood | May 16, 1944 |
| 2,410,443 | Hoffer | Nov. 5, 1946 |

Certificate of Correction

Patent No. 2,573,101 — October 30, 1951

HJALMER HANSEN

It is hereby certified that error appears in the printed specification of the above numbered patent requiring correction as follows:

Column 1, line 27, for "object" read *objects*; column 5, line 34, after "retracted" insert *position*; column 7, line 51, for "working" read *work*; line 60, for "the gear" read *said gear*; column 8, line 35, for "journalled" read *journaled*; column 9, line 12, for "transverse" read *traverse*; and that the said Letters Patent should be read as corrected above, so that the same may conform to the record of the case in the Patent Office.

Signed and sealed this 5th day of February, A. D. 1952.

[SEAL]

THOMAS F. MURPHY,
*Assistant Commissioner of Patents.*